United States Patent Office 3,304,311
Patented Feb. 14, 1967

3,304,311
ANTHRAQUINONYL VAT DYESTUFFS
Kurt Weber and Max Jost, Basel, Switzerland, assignors to Ciba Limited, Basel, Switzerland, a Swiss company
No Drawing. Filed Aug. 1, 1962, Ser. No. 213,856
Claims priority, application Switzerland, Aug. 11, 1961, 9,453/61; June 20, 1962, 7,459/62
5 Claims. (Cl. 260—303)

The present invention provides new vat dyestuffs that contain sulfonic acid groups, but which are free from carboxylic acid amide groups and azo groups, and that contain two anthraquinones bound through a thiophene, furan, pyrrole, imidazole, oxazole, thiazole, triazole or thiadiazole ring.

By anthraquinones is meant not only the tricyclic 9:10-dioxoanthracene rings, but also those that contain one or more fused heterocyclic rings.

The term "vat dyestuffs" includes dyestuffs capable of being reduced into a so-called leuco form or vat which has better affinity for natural and regenerated cellulose fibers than has the non-reduced form, and which can be reconverted by oxidation into the original chromophoric system.

In addition to at least one sulfonic acid group, the dyestuffs may contain substituents that are usual in vat dyestuffs, for example, halogen atoms, alkoxy groups, alkyl groups, sulfonic acid amide groups or sulfone groups. However, they may not contain azo groups or carboxylic acid amide groups, that is to say, acylamino groups.

Such substituents may enter into chemical linkage with one another or with cellulose, for example, the halogen-pyridazone, isothiocyanate, epoxy, β-halogen-ethylsulfone, β-sulfato-ethyl-sulfone, vinylsulfone or the sulfonic acid-N:β-sulfato-ethyl amide group. By sulfonic acid groups is meant stable sulfonic acid groups that are not split off in the vat.

The new dyestuffs are obtained when (a) a vat dyestuff that is free from azo and carbamide groups and that contains two anthraquinone rings of the kind defined above bound through a thiophene, furan, pyrrole, imidazole, oxazole, thiazole, triazole or thiadiazole ring is treated with a sulfonating agent until at least one $SO_3H$ group is introduced into the dyestuff molecule, or (b) a vat dyestuff that is free from azo and carbamide groups and that contain two anthraquinone rings of the kind defined above bound through a thiophene, furan, pyrrole, imidazole, oxazole, thiazole, triazole or thiadiazole ring, and at least one functionally modified sulfonic acid group, for example, a sulfonic acid halide group, is subjected to hydrolysis, or (c) an appropriate vat dyestuff or vat dyestuff intermediate product free from azo groups and containing at least one sulfonic acid group, that between two rings of two anthraquinones of the kind defined above contains at least one grouping that can be cyclized to form a heterocyclic 5-membered ring of the aforesaid kind is treated with an agent that brings about ring closure, or (d) a vat dyestuff that is free from azo group and carbamide groups and that contains two anthra quinone rings of the kind defined above bound through a thiophene, furan, pyrrole, imidazole, oxazole, thiazole, triazole or thiadiazole ring, and a substituent oxidizable into a sulfonic acid group is treated with an oxidizing agent.

As starting materials for method (a) of the process, there are used vat dyestuffs that are free from acylamino groups and that contain a thiophene, furan, pyrrole, imidazole, oxazole, thiazole, triazole or thiadiazole bridge between two anthraquinones of the kind defined above.

As examples of such starting materials there are mentioned compounds of the formulae

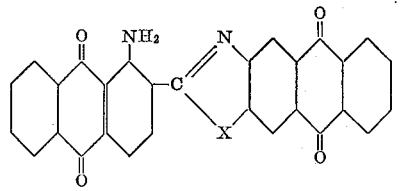

(X=O or S)

and

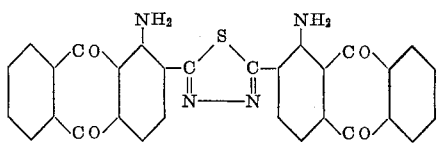

The sulfonation of such vat dyestuffs can be carried out by methods in themselves known, for example, by heating with oleum or in sulfuric acid. By a treatment with chlorosulfonic acid there are obtained sulfonic acid chlorides that, in accordance with method (b) of the present process, can be converted into the vat dyestuffs of the invention by hydrolysis, for example, by means of alkali metal hydroxides or alkali metal carbonates in an aqueous medium.

As starting materials for method (b) of the process there are used vat dyestuffs that do not contain an azo group but that contain a sulfonic acid group that is characteristic of the dyestuffs of the invention, and, in addition, a grouping that is capable of closing a 5-ring of the kind defined above. Such a group is, for example, the imino bridge between two anthraquinones of the kind defined above that is suitable for carbazolation.

The carbazolation must, of course, be carried out under conditions that do not bring about elimination of the sulfonic acid groups present in the starting materials, or if there are no sulfonic acid groups in the starting materials it must be carried out under conditions that also provide for the introduction of at least one such group, for example, by means of concentrated sulfuric acid or oleum.

If the vat dyestuffs free from azo groups and carbamide groups already contain a heterocyclic 5-membered ring of the kind defined above and, for example, a $Cl-CH_2$ group, this latter group can, by reaction with thiourea and elimination of the isothiuronium group formed thereby by means of an alkali, be converted into an $HS-CH_2$ group which, in accordance with method (d) of this process, can be oxidized to form a sulfonic acid group.

The dyestuffs obtained by the process of the invention are new. They are suitable for dyeing and printing a very wide variety of materials, but especially for dyeing or printing textile materials of natural or regenerated cellulose by the usual vat dyeing or printing methods. The dyeings and prints produced therewith are generally fast to chlorine, and are distinguished by their excellent fastness to light and excellent properties of wet fastness, especially their good fastness to soda boiling. The dyeings produced with the dyestuffs of the invention are fast to dry cleaning and migration. The dyed fabrics can therefore be coated with synthetic resins, for example, polyvinyl chloride, without the dyestuff migrating into the resin, which is particularly important in the manufacture of artificial leather.

As compared with the conventional vat dyestuffs, the vat dyestuffs of the invention have a better levelling and penetrating power. When used for dyeing in circulating liquor machines they do not give rise to faulty dyeings caused by the precipitation of reoxidized dyestuff even when foam is formed, and the pigmenting operation that is necessary in dyeing wound packages, for example, cheeses, or in dyeing tricots on a winch machine, with the conventional vat dyestuffs, is omitted in the case of the dyestuffs of the invention. They can also be used in the form of solutions in the fast-running pad-dyeing processes, and in this case they do not have to be in a finely dispersed commercial form or in the form of special pastes, so that the disadvantages of such forms (instability of the paste, dusting, and the need for one or more operations to prepare finely divided powders) are eliminated. Finally, they can generally be vatted very easily, often at room temperature, and, if required, with mild reducing agents. They possess a very good solubility in the vat, and yield strong and very level dyeings especially on regenerated cellulose that exhibit often the same tint as the corresponding dyeings on cotton.

The following examples illustrate the invention; unless otherwise stated, the parts and percentages are by weight, and the relationship of parts by weight to parts by volume is the same as that of the gram to the milliliter.

*Example 1*

4.2 parts of the dyestuff of the formula

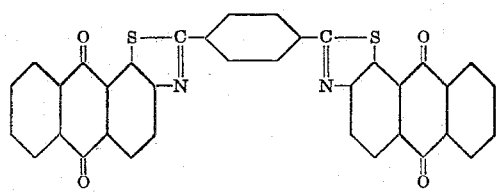

are introduced into 150 parts of oleum having an SO$_3$-content of 10% and therein dissolved. The solution so obtained is then heated for one hour at 100 to 105° C. and then for 3 hours at 120 to 125° C., while stirring. After cooling the solution it is cautiously poured onto about 100 parts of ice, and the product that precipitates thereby is filtered off and suspended in 1000 parts of water. The suspension is then exactly neutralized at 50 to 60° C. with sodium hydroxide solution, and the dyestuff is precipitated by the addition of 50 parts of sodium chloride. It is then filtered off and dried.

The new dyestuff so obtained corresponds to the formula

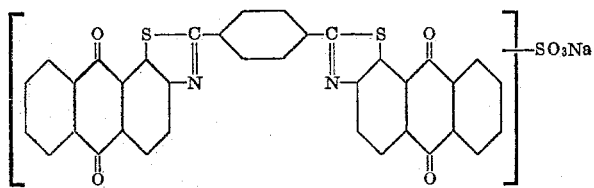

and is completely soluble in water, giving a yellow solution.

*Dyeing prescription.*—0.15 part of the above dyestuff is dissolved in 50 parts of hot water. The yellow solution is poured into a solution, having a temperature of 60° C., of 2 parts by volume of sodium hydroxide solution of 30% strength and 1.2 parts of sodium hydrosulfite in 350 parts of water. 10 parts of cotton are immediately entered into the dyebath so prepared and dyeing is carried out at 60° C. for 45 minutes in the presence of sodium chloride. After the dyeing operation, the cotton is oxidized, washed, acidified, again rinsed and then soaped at the boil. There is obtained a bright, greenish yellow dyeing possessing excellent properties of fastness.

*Example 2*

5 parts of the dyestuff of the formula

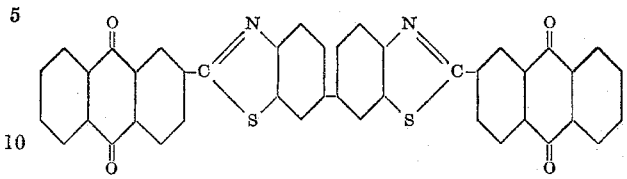

are introduced into 150 parts of oleum having an SO$_3$-content of 10% and therein dissolved. The solution so obtained is then stirred for 5 hours at 120 to 125° C. After cooling, the solution is cautiously poured onto about 1000 parts of ice, and the product that precipitates thereby is filtered off, dissolved at 40 to 50° C. in about 500 parts of water, and the solution so obtained is then exactly neutralized with sodium hydroxide solution. The dyestuff is precipitated by the addition of 75 parts of sodium chloride. It is then filtered off and dried in vacuo at 90 to 100° C.

The new dyestuff so obtained is a mixture of the sodium salts of the mono- and di-sulfonic acids of the dyestuff used as starting material of the above formula, and it exhibits good solubility in water.

The dyestuff so obtained yields yellow dyeings possessing excellent properties of fastness when applied according to the dyeing prescription given in Example 1.

*Example 3*

To a suspension of 3.4 parts of the sodium salt of 2-amino-3-hydroxyanthraquinone-x-sulfonic acid in 60 parts of N-methyl-pyrrolidine is added, while stirring, a solution, having a temperature of 90° C., of 3.15 parts of 1-nitroanthraquinone-2-carboxylic acid chloride in 70 parts of dry nitrobenzene, and the mixture so obtained is stirred for 15 hours at 145 to 150° C. After cooling the reaction mixture, the by-products, of which a small quantity is formed, are abstracted by filtration and, after expulsion of the nitrobenzene, the main product is recovered by steam distillation.

A solution of 2.5 parts of the product so obtained in 100 parts of concentrated sulfuric acid is stirred for 2 hours at 100 to 105° C. The intermediate product so obtained is precipitated by diluting the sulfuric acid solution to a concentration of 73%. It is then filtered off and washed successively with sulfuric acid of 70% strength and water.

To a suspension of the moist product in 300 parts of water are added 16.5 parts of sodium hydroxide solution of 30% strength and 6.25 parts of sodium hydrosulfite, and the whole is stirred for 30 minutes at 50° C. By treating the solution so obtained with air and by salting out there is obtained the dyestuff of the formula

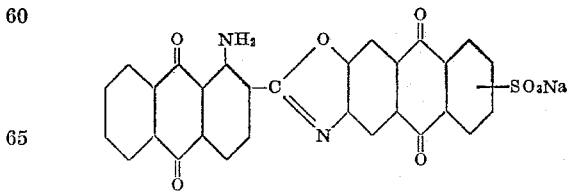

It dyes cotton red tints possessing good properties of fastness.

2-amino-3-hydroxyanthraquinone-x-sulfonic acid can be obtained by treating 2-amino-3-hydroxyanthraquinone for 2 hours at 140° C. with oleum of 27% strength in the presence of boric acid and mercurous sulfate.

A dyestuff having similar properties can be obtained by stirring 10 parts of the dyestuff of the formula

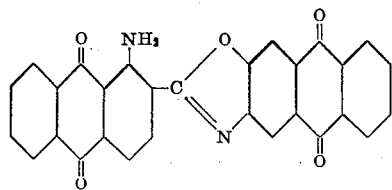

for several hours at 85° C. with a mixture of 100 parts of oleum of 27% strength, 5 parts of boric acid and 1 part of mercurous sulfate. The reaction mixture is then poured onto ice and the precipitated product is filtered off, dissolved in a hot, dilute sodium carbonate solution and then precipitated with sodium chloride.

*Example 4*

4.9 parts of anhydrous sulfato-terephthalic acid and 11 parts of 1:2-diaminoanthraquinone are introduced into 150 parts of sulfuric acid monohydrate and the mixture is heated for 8 hours at 155° C. The temperature is then allowed to drop to 70° C. and 60 parts of water are slowly added at that temperature. The reaction mixture is then cooled to room temperature, the precipitated dyestuff is filtered off and it is then washed successively with sulfuric acid of 70% strength and a dilute solution of sodium chloride.

The dyestuff so obtained dyes cotton yellow tints possessing good properties of fastness from a red-violet vat and corresponds to the formula

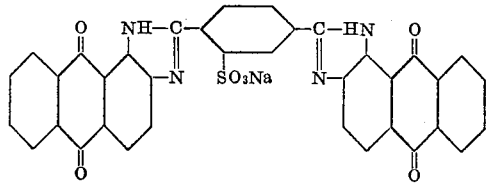

A dyestuff having similar properties can be obtained by treating the dyestuff which has the formula

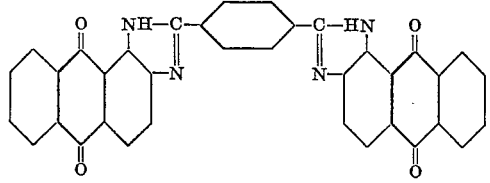

with a sulfating agent at a raised temperature and in the presence of mercurous sulfate.

*Example 5*

3 parts of the dyestuff of the formula

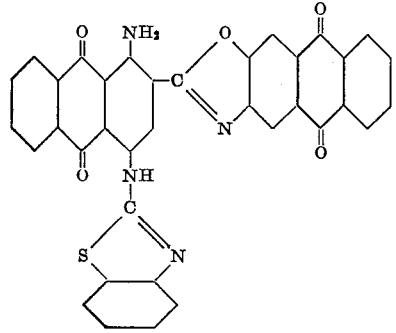

are introduced into a mixture of 50 parts of oleum of 10% strength, 2 parts of boric acid and 0.3 part of mercurous sulfate, and the whole is stirred at 85° C. until a test portion is completely soluble in water. After cooling the reaction mixture, it is poured into ice water. The precipitate is filtered off, suspended in water at 80° C. and then neutralized with a solution of sodium hydroxide. The dyestuff so obtained is precipitated by the addition of sodium chloride. It dyes cotton strong, blue-green tints possessing excellent properties of fastness and corresponds to the formula

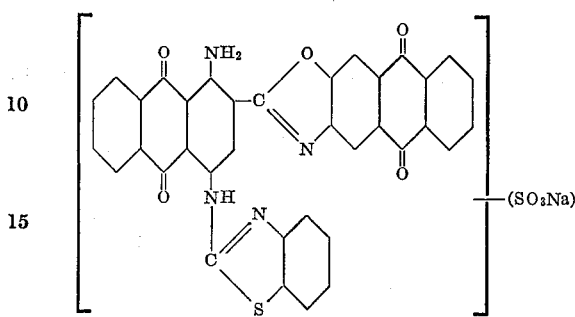

The dyestuff used as starting material can be obtained, for example, by reacting 2-(1':4'-diaminoanthraquinonyl-2')-5:6-phthaloylbenzoxazole with 2-chloro-benzthiazole in phenol at 165° C.

What is claimed is:
1. A vat dyestuff selected from the group consisting of those of the formulae:

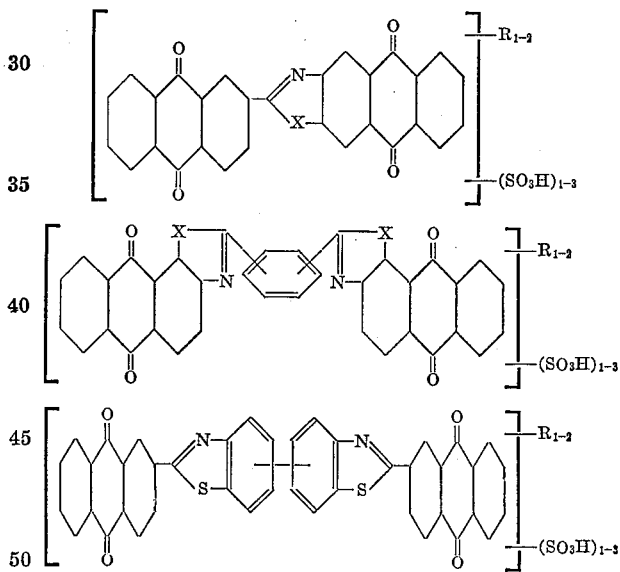

and

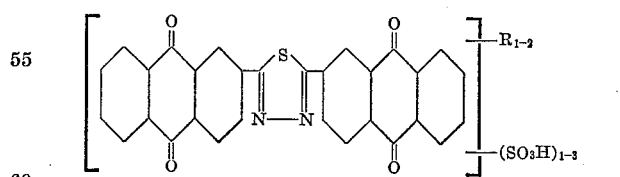

wherein each R is independently selected from the group consisting of amino, 2-benzothiazolylamino, halogen, lower alkoxy, lower alkyl, aminosulfonyl, isothiocyano, epoxyethylene, β-haloethylsulfonyl, β-sulfatoethylsulfonyl, vinylsulfonyl, and N-(β-sulfatoethyl)aminosulfonyl; and X is —O—, —S—, or —NH—.

2. The vat dyestuff of the formula

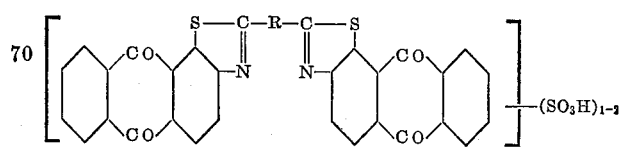

wherein R is a benzene nucleus.

3. The vat dyestuff of the formula
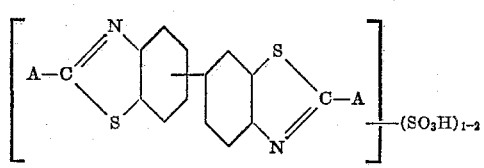
wherein A represents β-anthraquinonyl.
4. The vat dyestuff of the formula
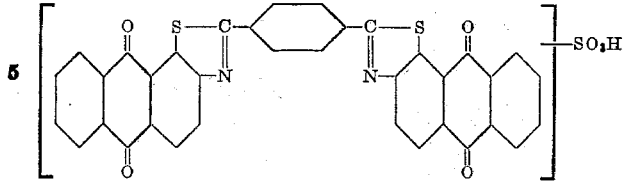
5. The dyestuff of the formula
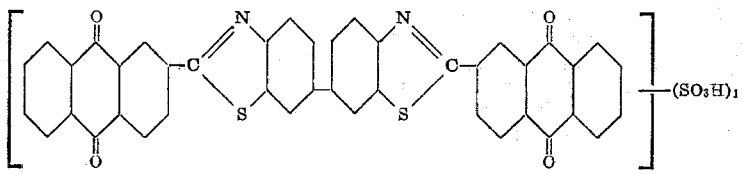
References Cited by the Examiner
UNITED STATES PATENTS
| | | | |
|---|---|---|---|
| 1,459,536 | 6/1923 | Kacer | 260—303 |
| 2,045,817 | 6/1936 | Zerweck et al. | 260—303 |
| 2,680,114 | 6/1954 | Startori | 260—256.5 |
| 2,719,838 | 10/1955 | Deinet | 260—303 |
| 2,868,799 | 1/1959 | Neeff | 260—303 |
ALEX MAZEL, *Primary Examiner.*
NICHOLAS RIZZO, *Examiner.*
ALTON D. ROLLINS, *Assistant Examiner.*

UNITED STATES PATENT OFFICE
CERTIFICATE OF CORRECTION

Patent No. 3,304,311                                    February 14, 1967

Kurt Weber et al.

It is hereby certified that error appears in the above numbered patent requiring correction and that the said Letters Patent should read as corrected below.

Column 8, claim 5, the right-hand portion of the formula should appear as shown below instead of as in the patent:

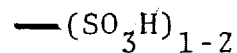

$$-(SO_3H)_{1-2}$$

Signed and sealed this 7th day of November 1967.

(SEAL)
Attest:

Edward M. Fletcher, Jr.                            EDWARD J. BRENNER

Attesting Officer                                       Commissioner of Patents